(12) United States Patent
Miller et al.

(10) Patent No.: US 7,007,197 B2
(45) Date of Patent: Feb. 28, 2006

(54) VIRTUAL LOGGING SYSTEM AND METHOD

(75) Inventors: Thomas Jay Miller, Bellevue, WA (US); Dexter Paul Bradshaw, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 556 days.

(21) Appl. No.: 10/159,227

(22) Filed: May 31, 2002

(65) Prior Publication Data

US 2003/0226058 A1 Dec. 4, 2003

(51) Int. Cl.
*G06F 11/00* (2006.01)

(52) U.S. Cl. .............................. 714/15; 718/1; 718/101; 707/202; 707/8

(58) Field of Classification Search ................ 707/202, 707/8; 718/101, 1; 714/15
See application file for complete search history.

(56) References Cited

U.S. PATENT DOCUMENTS

| | | | | |
|---|---|---|---|---|
| 5,333,316 A | * | 7/1994 | Champagne et al. | 707/8 |
| 5,737,600 A | * | 4/1998 | Geiner et al. | 707/200 |
| 5,873,085 A | * | 2/1999 | Enoki et al. | 707/10 |
| 6,125,393 A | * | 9/2000 | Clark et al. | 709/224 |
| 6,138,118 A | * | 10/2000 | Koppstein et al. | 707/8 |
| 6,173,293 B1 | * | 1/2001 | Thekkath et al. | 707/201 |
| 6,591,228 B1 | * | 7/2003 | Hall et al. | 702/187 |
| 6,728,746 B1 | * | 4/2004 | Murase et al. | 718/1 |
| 6,728,879 B1 | * | 4/2004 | Atkinson | 713/168 |
| 6,801,938 B1 | * | 10/2004 | Bookman et al. | 709/224 |
| 6,850,942 B1 | * | 2/2005 | Cotner et al. | 707/10 |
| 2002/0099843 A1 | * | 7/2002 | Fruchtman et al. | 709/232 |
| 2003/0225585 A1 | * | 12/2003 | Miller et al. | 705/1 |
| 2003/0233389 A1 | * | 12/2003 | Bradshaw et al. | 709/101 |
| 2004/0030703 A1 | * | 2/2004 | Bourbonnais et al. | 707/100 |
| 2004/0103123 A1 | * | 5/2004 | Bradshaw | 707/202 |
| 2005/0028171 A1 | * | 2/2005 | Kougiouris et al. | 719/318 |

OTHER PUBLICATIONS

*ARIES: A Transaction Recovery Method Supporting Fine-Granularity Locking and Partial Rollbacks Using Write-Ahead Logging*; C. Mohan, IBM Almaden Research Center, Don Haderle, IBM Santa Teresa Laboratory and Bruce Lindsay, Hamid Pirahesh and Peter Schwarz, IBM Almaden Research Center; ACM Transactions on Database Systems, vol. 17, No. 1, Mar. 1992.

* cited by examiner

*Primary Examiner*—Robert Beausoliel
*Assistant Examiner*—Christopher McCarthy
(74) *Attorney, Agent, or Firm*—Merchant & Gould P.C.

(57) ABSTRACT

A common transactional logging system (a "virtual logging system") that presents to one or more log clients the appearance that each log client is interacting with a dedicated logging system. In reality, the virtual logging system is multiplexing multiple virtual log streams, including log records, for each log client into a single transactional log.

7 Claims, 14 Drawing Sheets

VIRTUAL LOGGING SYSTEM AND METHOD

BACKGROUND OF THE INVENTION

The notion of a transaction is an important concept for transactional systems, such as database management systems, recoverable file systems and transaction-based operation systems. Briefly stated, a transaction is an action or set of actions that includes the ACID (Atomicity, Consistency, Isolation and Durability) properties. Transactional logging involves maintaining a transactional log that durably records a time serial history of transactions in a system. A transactional log provides information for restoring a system to a particular state in time prior to a system failure. ARIES (Algorithm for Recovery and Isolation Exploiting Semantics) is one very popular recovery scheme used for restoring a failed system through transactional logging.

Because system recovery is often a desired attribute, transactional logging is a core feature in many database systems and transaction managers. Transactions are typically recorded in a transactional log by a logging service in case the transactions need to be rolled back because of a failure. The basic functions of a transactional logging service are to marshal client data into log records, store the records in a storage media, and read the log records back in a reliable manner.

Traditionally, each client makes use of a dedicated transactional logging service that has log files, I/O bandwidth, and disk storage locations dedicated to the particular client. Dedicated transactional logging services are efficient when only a single client is included. When multiple log clients exist on a system, multiple dedicated logging services are necessary, which causes the overall system performance to suffer because of duplicated efforts. The requirements for separate I/O bandwidth and disk storage locations create large system overhead just for maintaining a log. The development of a logging service that can operate efficiently while conserving overall system resources and system overhead continues to elude those skilled in the art.

SUMMARY OF THE INVENTION

Briefly stated, this invention is directed toward a virtual logging system and method for making a physical log available through a single common logging engine to multiple log clients. The virtual logging system includes a common logging engine that is configured to receive multiple virtual log streams. Each virtual log stream includes log data associated with one of the log clients. The common logging engine multiplexes the virtual log streams into a single physical log stream. In one aspect, the common log engine of the transactional logging system is configured to receive virtual log streams from a remote client over a network.

In another aspect, the invention is directed toward a virtual logging system that includes a plurality of distributed logging modules and a common logging engine. Each of the distributed logging modules is associated with a computer application program and provides an illusion to its associated computer application program that a dedicated log is maintained exclusively for the computer application program. The distributed logging modules marshal log data of their associated computer application programs and send the marshaled log data to the common logging engine. The common logging engine receives the marshaled log data from the distributed logging modules and multiplexes the marshaled log data into a single physical log.

In yet another aspect, the invention is directed toward a computer-readable medium encoded with a data structure that represents a multiplexed log. The data structure comprises two data fields. The first data field includes data blocks where each data block contains log data related to a computer application program. The second data field associates each of the data blocks with the computer application program to which the log data contained in the data block are related.

DETAILED DESCRIPTION OF THE PREFERRED EMBODIMENT

Briefly stated, the present invention enables a common transactional logging system (a "virtual logging system") that presents to one or more log clients the appearance that each log client is interacting with a dedicated logging system. In reality, the virtual logging system is multiplexing virtual log streams, including log records, for each log client into a single transactional log. The virtual logging system offers a secure logging environment for the log clients such that the log records of one client may not be accessed by another client. The virtual logging system also possesses failure isolation mechanisms that prevent one corrupted virtual stream to affect another virtual stream.

Transactional Logging

One aspect of a transactional logging system is to use a transactional log to restore a failed system. The transactional logging system may perform various functions, depending upon which recovery scheme is used. For example, the ARIES recovery scheme requires that sufficient amount of storage space be available to undo the transactions that had already been appended to a log. The storage space is typically used for undo log records and compensation (undo-compensation) log records. It is to be understood that the virtual logging system and method discussed below is capable of performing functions to support ARIES and other similar recovery schemes.

Overview

Figure 1:
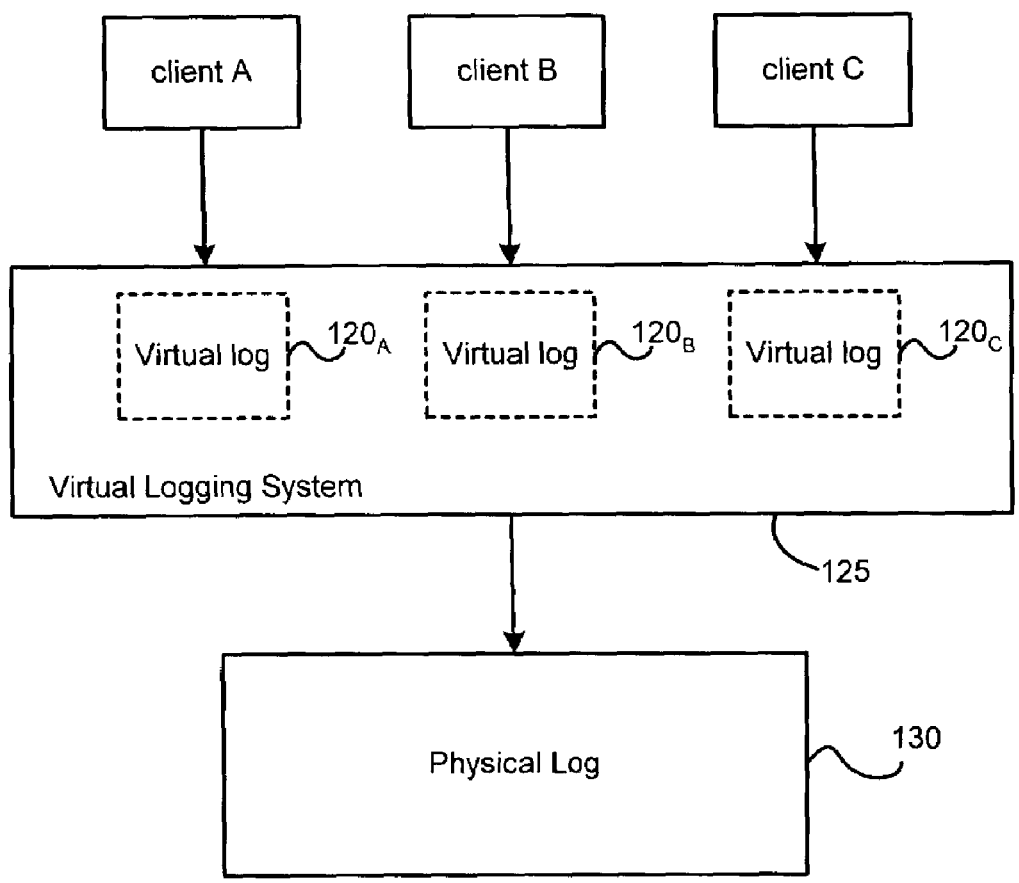
FIG. 1 illustrates a graphical overview of a virtual logging system in accordance with the invention.

FIG. 1 illustrates a graphical overview of a virtual logging system in accordance with the invention. As shown in the figure, virtual logging system 125 may maintain logs for multiple clients, such as clients A, B and C. Virtual logging system 125 provides the illusion to each of clients A, B, and C that a separate log is kept for each client. Clients A, B, and C send log records to be logged by virtual logging system 125 as if they are sending the log records to be stored in their own dedicated logs, which are represented in the figure as virtual logs $120_{A-C}$. Actually, virtual logging system 125 multiplexes the log records sent by the clients into a single physical log 130, which may be stored in a storage unit. In accordance with the invention, a physical log means the log data actually stored on a storage unit. A virtual log means portion of the physical log presented to a particular log client as a simulated dedicated log. These and other aspects of the invention will become apparent to those skilled in the art from the following detailed description.

Illustrative Operating Environment

Figure 2:
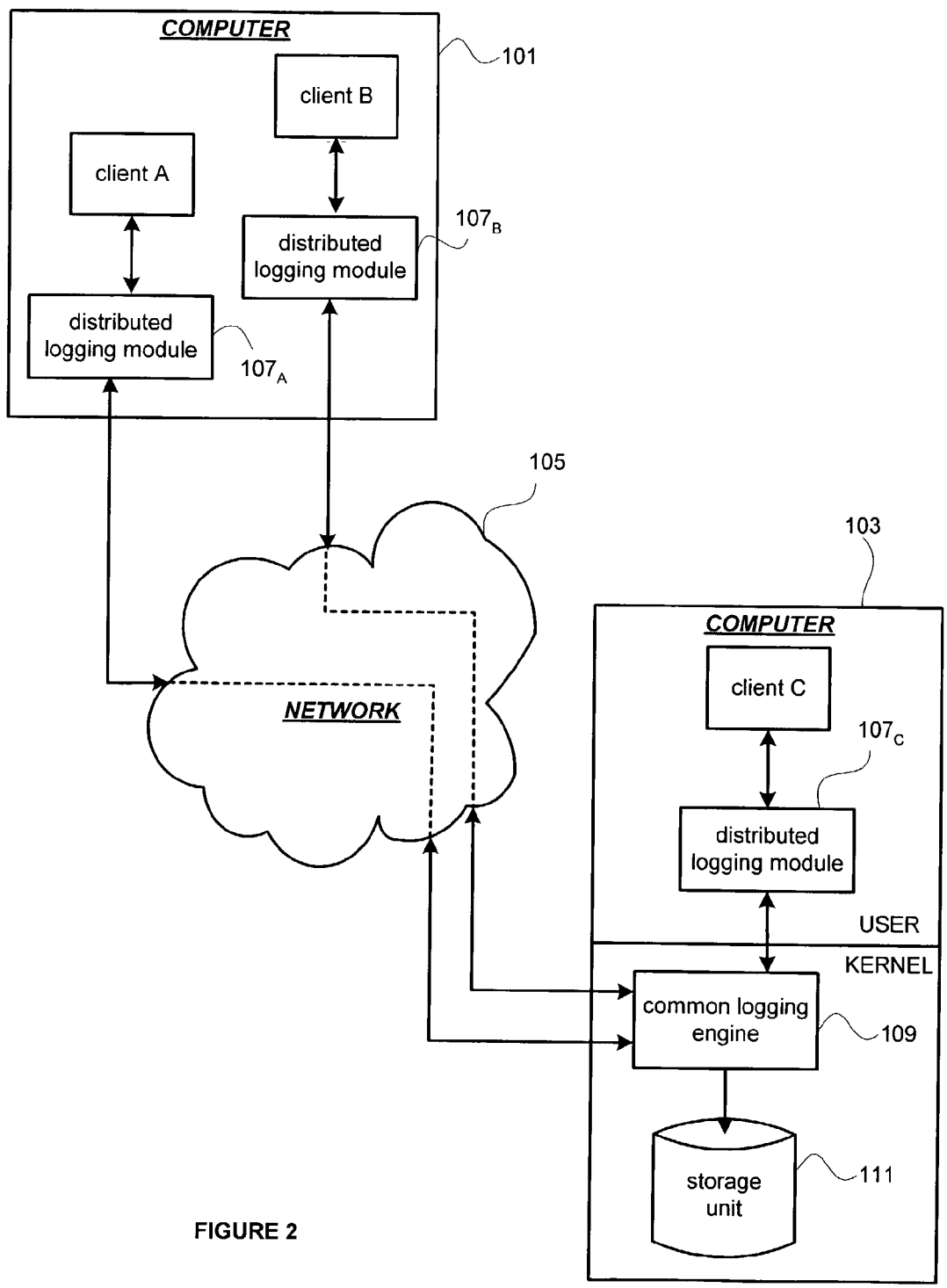
FIG. 2 shows an exemplary inter-network virtual logging system that implements this invention.

FIG. 2 and the following discussion are intended to provide a brief general overview of a suitable operating environment in which the invention may be implemented. Although not required, this invention will be described in the general context of computer-executable instructions, such as program modules, being executed on a computer. Generally, program modules include routines, programs, objects, components, data structures and the like that perform particular tasks or implement particular abstract data types.

Moreover, those skilled in the art will appreciate that this invention could be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 2 shows an exemplary inter-network virtual logging system 100 that implements this invention, according to one embodiment of the invention. In other configurations, inter-network virtual logging system 100 may include many more components than those shown. As shown in the figure, inter-network virtual logging system 100 includes distributed logging modules $107_{A-B}$ executing on computer 101, and distributed logging module $107_C$ and common logging engine 109 executing on computer 103. Distributed logging modules $107_{A-B}$ are in communication with common logging engine 109 through network 105. Each of computer 101 and computer 103 may be a conventional multipurpose computing system, such as a personal computer or server computer.

Computer 101 may include multiple clients, such as client A and client B. A client is a computer application program that maintains a log. A client may execute in the user mode or the kernel mode of a computer. As shown in the figure, both client A and client B maintain logs through their respective distributed logging modules $107_{A-B}$. Distributed logging modules will be described in detail in conjunction with FIG. 2. Briefly stated, a distributed logging module buffers log data on behalf of a client and communicates with a common logging engine. The distributed logging module marshals a client's log data and sends the marshaled log data as a virtual log stream to a common logging engine.

As shown in the figure, computer 103 also includes a log client, client C, that executes in the user mode and has an associated distributed logging module $107_C$. It is to be appreciated that client C and distributed logging module $107_C$ may also execute in the kernel mode. Computer 103 includes a common logging engine 109 that executes in the kernel mode. Common logging engine 109 will be described in detail in conjunction with FIG. 3. Briefly stated, common logging engine 109 multiplexes the log data from clients into a single physical log. As shown in the figure, common logging engine 109 receives virtual log streams from distributed logging modules $107_{A-B}$ in computer 101 though network 105. Common logging engine 109 may also receive virtual log streams from distributed logging module $107_C$ operating in the user mode of computer 103. Common logging engine 109 multiplexes the log data from remote clients A and B, and local client C into a physical log stream. Common logging engine 109 then appends the multiplexed physical log stream to a physical log stored in storage unit 111. Storage unit 111 may include any storage medium or device, such as a hard disk, a CD-writer, non-volatile RAM, etc.

Network 105 may be any network capable of connecting computers. Examples of network 105 include a local area network (LAN) and a wide area network (WAN), such as the Internet. As shown in the figure, network 105 connects distributed logging modules $107_{A-B}$ in computer 101 with common logging engine 109 in computer 103. Distributed logging modules $107_{A-B}$ and common logging engine 109 may communicate through any communication mechanisms, such as TCP/IP, datagrams, Wi-Fi, Bluetooth, application-based high speed interconnects, remote procedure calls (RPC), etc.

Communication media between computer 101 and a computer 103 typically embodies computer readable instructions, program modules or other data in a modulated data signal such as a carrier wave or other transport mechanism and includes any information delivery media. The term "modulated signal" means a signal that has one or more of its characteristics set or changed in such a manner as to encode information in the signal. By way of example, not limitation, communication media includes wired media such as a wired network or direct-wired connection, and wireless media such as acoustic, RF, infrared and other wireless media. Combinations of any of the above are also included within the scope of computer readable media.

Virtual Logging System

Figure 3:
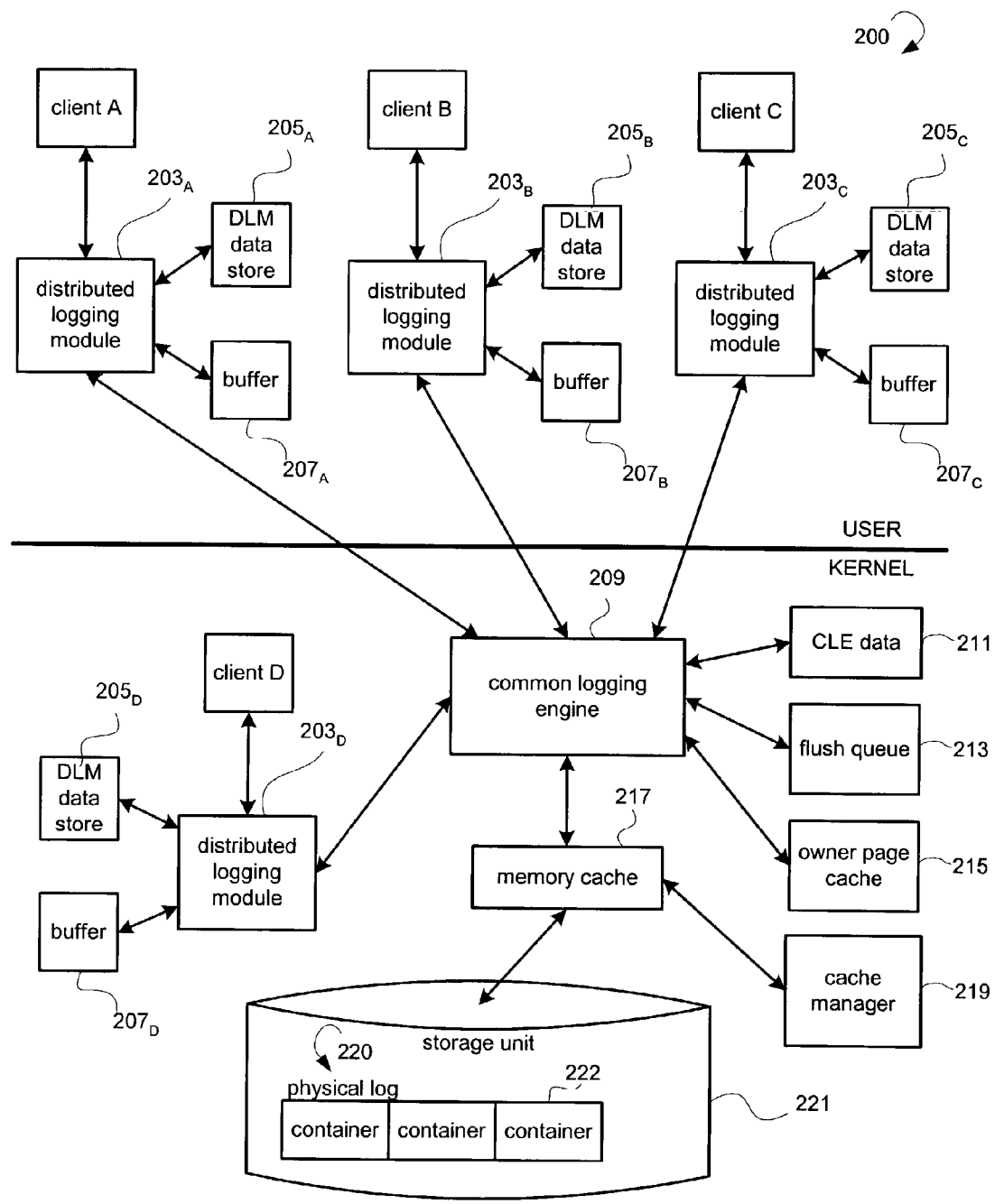
FIG. 3 shows an exemplary virtual logging system that implements this invention.

FIG. 3 shows an exemplary virtual logging system 200 that implements one embodiment of the invention. Virtual logging system 200 may be implemented entirely on a single computer or on multiple computers.

Clients A, B, and C are computer application programs that execute in the user mode and maintain a log. A database program is an example of such user mode application programs. Clients A, B, and C may be executing on the same computer or different computers. Client D is also a computer application program that maintains a log but executes in the kernel mode. An example of such kernel mode application program is a transactional file system. Any one or more of Clients A, B, C or D may be executing on a different computer than the computer on which common logging engine 209 is implemented.

Distributed logging modules $203_{A\text{-}D}$ are components of virtual logging system 200 that maintain logs for their corresponding clients. Each of the distributed logging modules $203_{A\text{-}D}$ marshals log data of its associated client and sends the log data to common logging engine 209.

Buffers $207_{A\text{-}D}$ are memory buffers used by distributed logging modules $203_{A\text{-}D}$. Distributed logging modules $203_{A\text{-}D}$ may store the marshaled log data in their corresponding buffers $207_{A\text{-}D}$ before sending them as a virtual log stream to common logging engine 209. Distributed logging modules $203_{A\text{-}D}$ may also retrieve log data for their respective clients using buffers $207_{A\text{-}D}$.

Each of distributed logging modules $203_{A\text{-}D}$ may also include an application program interface (not shown) for interacting with its corresponding client. The application program interface enables a client to interact with the corresponding distributed logging module as if the distributed logging module maintains a dedicated log exclusively for the client. For example, using the application program interface, the client is able to write and retrieve log data through the distributed logging module without having to account for other clients' logging activities.

Distributed logging module data stores (DLM data stores) $205_{A\text{-}D}$ are data stores associated with corresponding distributed logging modules $203_{A\text{-}D}$. DLM data stores $205_{A\text{-}D}$ contains accounting information used by distributed logging modules $203_{A\text{-}D}$ to administer the log data on behalf of clients. Accounting information in a DLM data store will be described in detail in conjunction with FIG. 6. Briefly stated, accounting information in a DLM data store may include storage space reservation data and next virtual LSN data. The accounting information in DLM data store 205 is synchronized with the accounting information in common logging engine data store (CLE data store) 211.

Storage unit 221 may include any storage device capable of storing data, such as a hard disk, a CD-writer, non-volatile RAM, etc. Storage unit 221 stores a physical log 220 created by common logging engine 209. Storage unit 221 is managed by a file system (not shown). In this embodiment, physical log 220 is divided into file containers 222, which are contiguous files allocated by the file system. Each of the file containers 222 may be of any size. In another embodiment of the invention, the size of containers is a multiple of 512 kilobyte (KB).

Memory cache 217 is a memory buffer that may be used for storing data that were most recently accessed from storage 221. Memory cache 217 enables common logging engine 209 to retrieve adjacent log records in physical log 220 without having to access storage 221 for each of the log records. Cache manager 219 manages memory cache 217 for computer application programs in the computer, including common logging engine 209. In one embodiment of the invention, cache manager 219 is a component of the computer's operating system for managing caching in the operating system.

Common logging engine 209 is a component in the kernel that maintains a physical log for one or more distributed logging modules. Common logging engine 209 may receive virtual log streams from distributed logging modules $203_{A\text{-}D}$. Common logging engine 209 multiplexes the virtual log streams into a single physical log stream and appends the multiplexed physical log stream to physical log 220 stored in storage unit 221. Common logging engine 209 may temporarily defer the multiplexed physical log stream in a flush queue 213 before appending it to the physical log. Flush queue 213 is a memory buffer used by common logging engine 209. Temporarily deferring the multiplexed physical log stream in a flush queue conserves system I/O overhead by reducing the number of accesses to the storage unit.

Metadata may be embedded in the physical log to provide information associated with the physical log. In one embodiment of the invention, metadata is included in the log as owner pages. Owner pages will be discussed in more detail in conjunction with FIG. 5. Briefly stated, an owner page identifies the owner of a particular log record within the log. The owner page may include a log block header, an owner referral and an owner array. Owner pages of the multiplexed log may be stored in an owner page cache 215. Owner page cache 215 is a memory buffer, which may be managed by cache manager 219. If owner page cache 215 is emptied due to a system shut down or restart, common logging engine 209 scans log 220 to retrieve owner pages and store them in the owner page cache 215.

Data Structure

Figure 4:
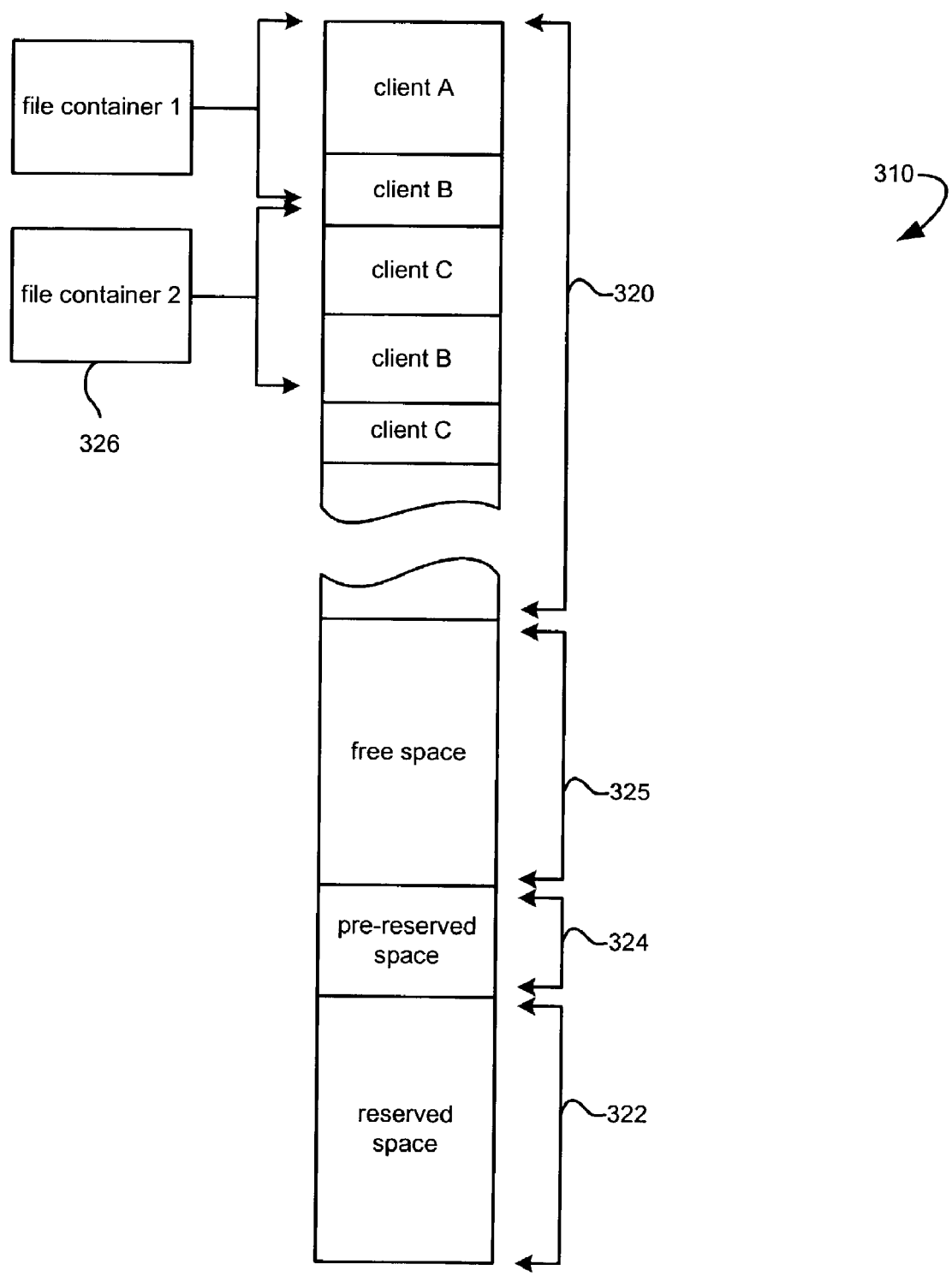
FIG. 4 is a graphical representation of one exemplary multiplexed log.

FIG. 4 is a graphical representation of an exemplary physical log. Physical log 310 is created by a common logging engine and occupies disk space allocated by a file system. As shown in the figure, multiplexed physical log 310 includes active log space 320, reserved log space 322, pre-reserved space 324, and free space 325.

Active log space 320 is a portion of physical log 310 that contains log data. Multiplexed log data in the active log space may be stored in multiple file containers 326, which are contiguous files allocated by the file system. As shown in the figure, active log space 320 may include log data from multiple clients.

Reserved space is a portion of physical log 310 that is reserved by distributed logging modules. Reserved storage space guarantees that undo records and compensation log records can be written to the physical log by a distributed logging module in the presence of writes by other distributed logging modules and possible exhaustion of the physical log. Pre-reserved space 324 is a portion of physical log 310 that is pre-reserved by distributed logging modules for storing log records that have not yet been sent to a common logging engine and the associated rollback records and compensation log records. Free space 325 is the remaining, unallocated portion of physical log 310.

Figure 5:
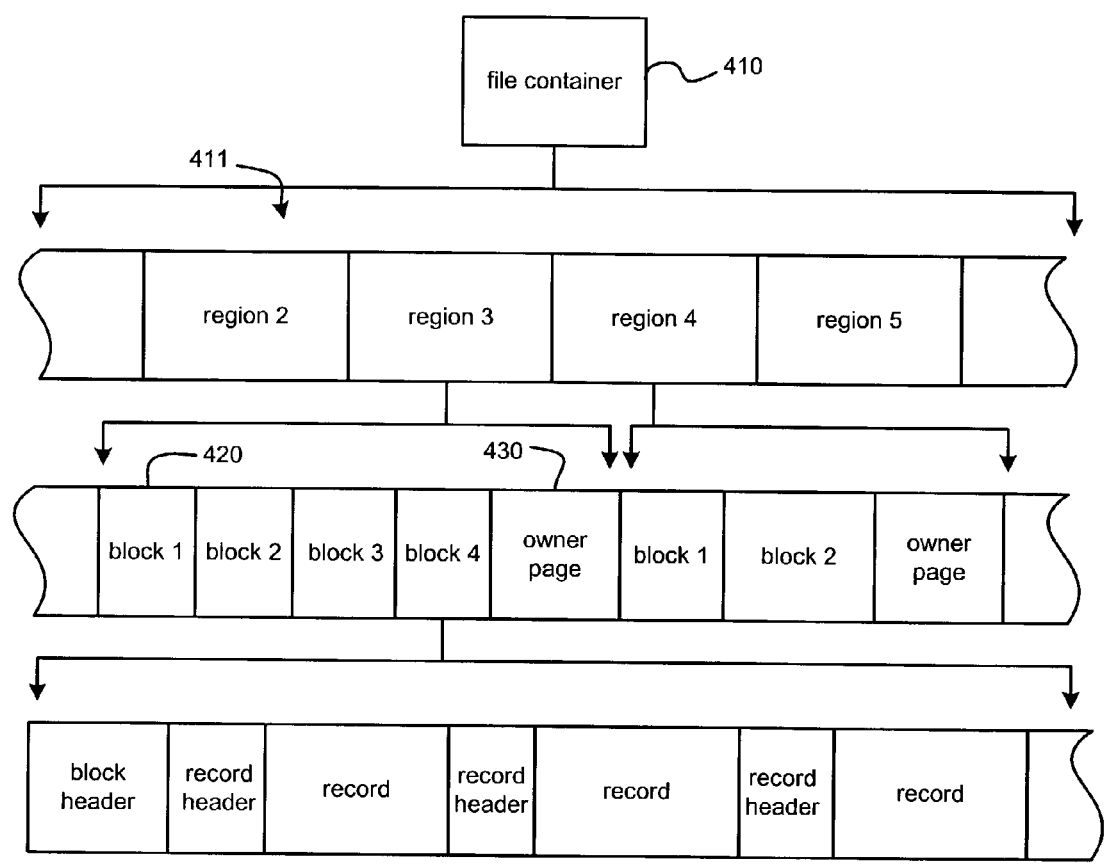
FIG. 5 is a graphical representation of one exemplary file container.

FIG. 5 is a graphical representation of an exemplary file container 410. File containers are contiguous files allocated by a file system. A physical log may be distributed among a series of file containers. Each container may be divided into regions, which comprise log blocks. Each log block contains log records of a particular client.

A location in the physical log is identified by a log sequence number (LSN). A LSN is an identification number that includes file container identification, a sector-aligned block offset and a record sequence number. The file container identification identifies in which file container a specified log record is located. The sector-aligned block offset identifies a log block in a particular region where the specified log record is located. In particular, the sector-aligned block offset specifies the byte offset (in multiples of the sector size) from the beginning of the file container identified. The record sequence number identifies the log record among the series of log records in a log block. In particular, the record sequence number specifies the record offset from the beginning of a log block. In one embodiment, the size of an LSN is 64 bits, where the container identification is 32 bits, the block offset is 23 bits and the record sequence number is 9 bits.

A LSN can be either a virtual LSN or a physical LSN. A virtual LSN is an LSN that is assigned by a distributed logging module to identify the location of a log record in a virtual log stream. A physical LSN is an LSN that represents an actual location in a physical log.

As shown in the figure, file container 410 is divided into regions 411, each having the same size. A region a contiguous portion of the physical log and may contain one or more log blocks, such as log blocks 420. A log block is a minimum unit of log data that can be written to or read from the physical log. A log block may overlap two regions. (Not shown) A log block includes a log block header and plurality of log records. The log block header is created by a distributed logging component and may include many fields. A common logging engine fills in some of the fields of the log block header. The log block header is uniquely identified by a physical LSN, which is identified in one of the fields of the log block header that is filled in by the common logging engine. A log record includes a record header and log data. The record header contains a virtual LSN, which uniquely identifies it with a virtual log stream.

A region of a physical log also includes an owner page 430. Owner pages and their associated components will be described in more detail in conjunction with FIG. 6. Briefly stated, an owner page is created by the common logging engine and contains information identifying the log blocks in the region.

Figure 6:
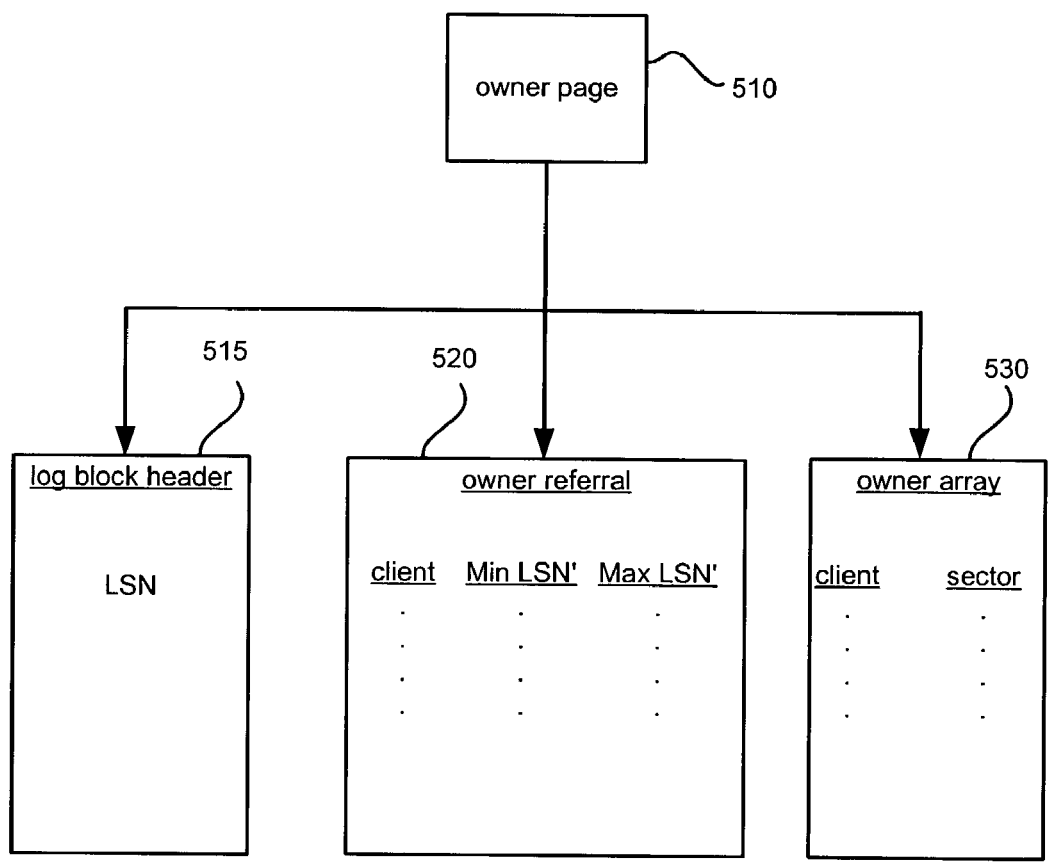
FIG. 6 is a graphical representation of one exemplary owner page.

FIG. 6 is a graphical representation of one exemplary owner page. The owner page contains information for locating log records in a log. In particular, information contained in the owner page is used to map a virtual LSN to a corresponding physical LSN. As illustrated in the figure, owner page 510 includes a log block header 515, an owner referral 520, and an owner array 530.

Log block header 515 includes a physical LSN of the log block. Log block header 515 provides the physical LSN of an owner page, which is used to map the virtual LSN to a physical LSN.

Owner referral 520 contains a range of virtual LSN in a region where a particular client has log records. The virtual LSN range is represented by a minimum virtual LSN and a maximum virtual LSN stored in the region. Owner referral 520 facilitates the retrieval of log records in the particular region specified by owner page 510. Briefly stated, when the common logging engine is instructed to retrieve a particular log record of a client, the common logging engine scans the owner referrals in each of the owner pages stored in the owner page cache. From the owner referrals, the common logging engine determines whether the virtual LSN of the log record to be retrieved falls within the LSN range specified in one of the owner referrals. If the LSN is determined to fall within the LSN range of a particular owner referral, the log record is located in the region associated with the owner referral.

Owner array 530 identifies the client owner of each of the sectors in a particular region of a file container. Once a log record is determined to be located in a particular region, the common logging engine uses the owner array within the owner page of the region and the virtual LSN of the log record to identify the log block where the log record is located. Then, a record sequence number is used to locate the record in the identified block.

Figure 7:
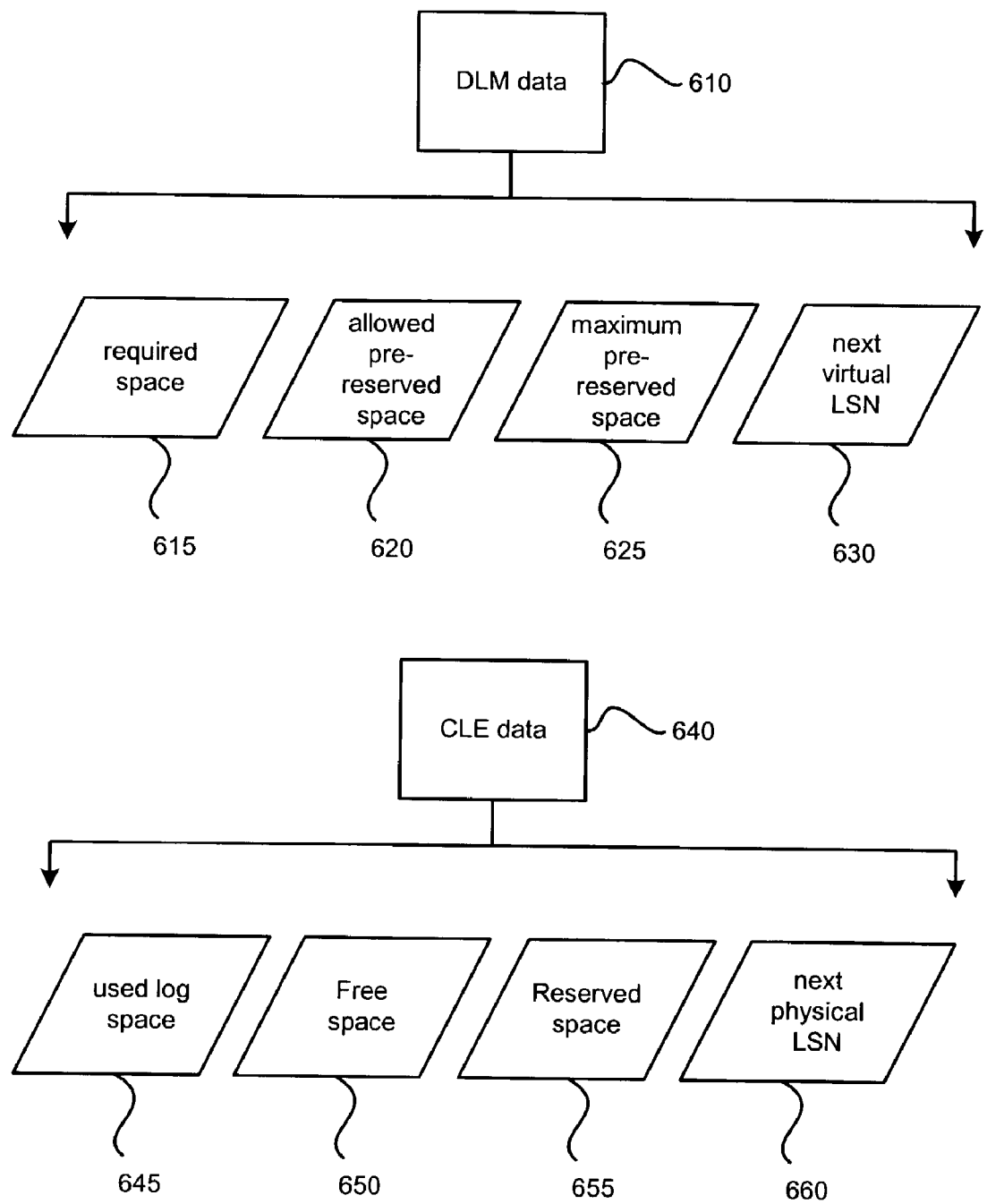
FIG. 7 is a graphical representation of illustrative client data and CLE data.

FIG. 7 is a graphical representation of illustrative DLM data and CLE data. DLM data and CLE data are data stored in DLM data store and CLE data store, respectively. DLM data 610 may be a data structure containing accounting information about the amount of storage space in a storage unit allocated to a common logging engine for storing a physical log. As shown in the figure, DLM data 610 may include actual reserved space 615, allowed pre-reserved space 620, maximum pre-reserved space 625, and next virtual LSN 630.

Maximum pre-reserved space 625 is the amount of space that the distributed logging module would prefer to have pre-reserved. The maximum pre-reserved space 625 may be based on the amount of space in the distributed logging module's buffer. A distributed logging module typically requests maximum pre-reserved space 625 from the common logging engine to ensure that the distributed logging module's entire buffer can be appended to the physical log at any time.

Allowed pre-reserved space 620 is the amount of space that the common logging engine has allowed the distributed logging module to pre-reserve. Allowed pre-reserved space 620 may be revised when updated accounting information regarding pre-reserved space is received from the common logging engine.

Required space 615 is the amount of space that is required to store marshaled log records that are already in the buffer. Required space 615 must be available in order for the marshaled log records to be successfully appended to the physical log. The distributed logging module will constantly compare the required space 615 to the allowed pre-reserved space 625. The common logging engine may write the log records to either free space or to the allowed pre-reserved space 620 belonging to the distributed logging module. If the log records are written to the allowed pre-served space, then accounting information is returned to the distributed logging module so that it may update its allowed pre-reserved space 620.

Next virtual LSN 630 is the log sequence number that is assigned to the next log record to be marshaled by a distributed logging module. Next virtual LSN 630 is revised by the distributed logging module when updated LSN data is received from the common logging engine. Next virtual LSN 630 may or may not be the same as the physical LSN to be assigned to the next log record multiplexed by the common logging engine.

CLE data 640 may be a data structure containing accounting information about the amount of storage space in a storage unit allocated to the physical log. As shown in the figure, CLE data 640 may include used log space 645, reserved space 655, free space 650, and next physical LSN 660. It is to be appreciated that CLE data 640 may also include other data. Used log space 645 is the space that contains log records written by the common logging engine. Reserved space 655 is the portion of the allocated space that has been reserved by distributed logging modules. Free space 650 is the portion of the allocated space that has not been used or pre-reserved.

Next physical LSN is the LSN that is assigned to the next log record that is to be written to a physical log by a common logging engine. When a distributed logging module sends a virtual log stream to the common logging engine, the common logging engine returns the next physical LSN to the distributed logging module. The distributed logging module would then synchronize next virtual LSN 630 with next physical LSN 660.

Virtual Logging Processes

Figure 8:
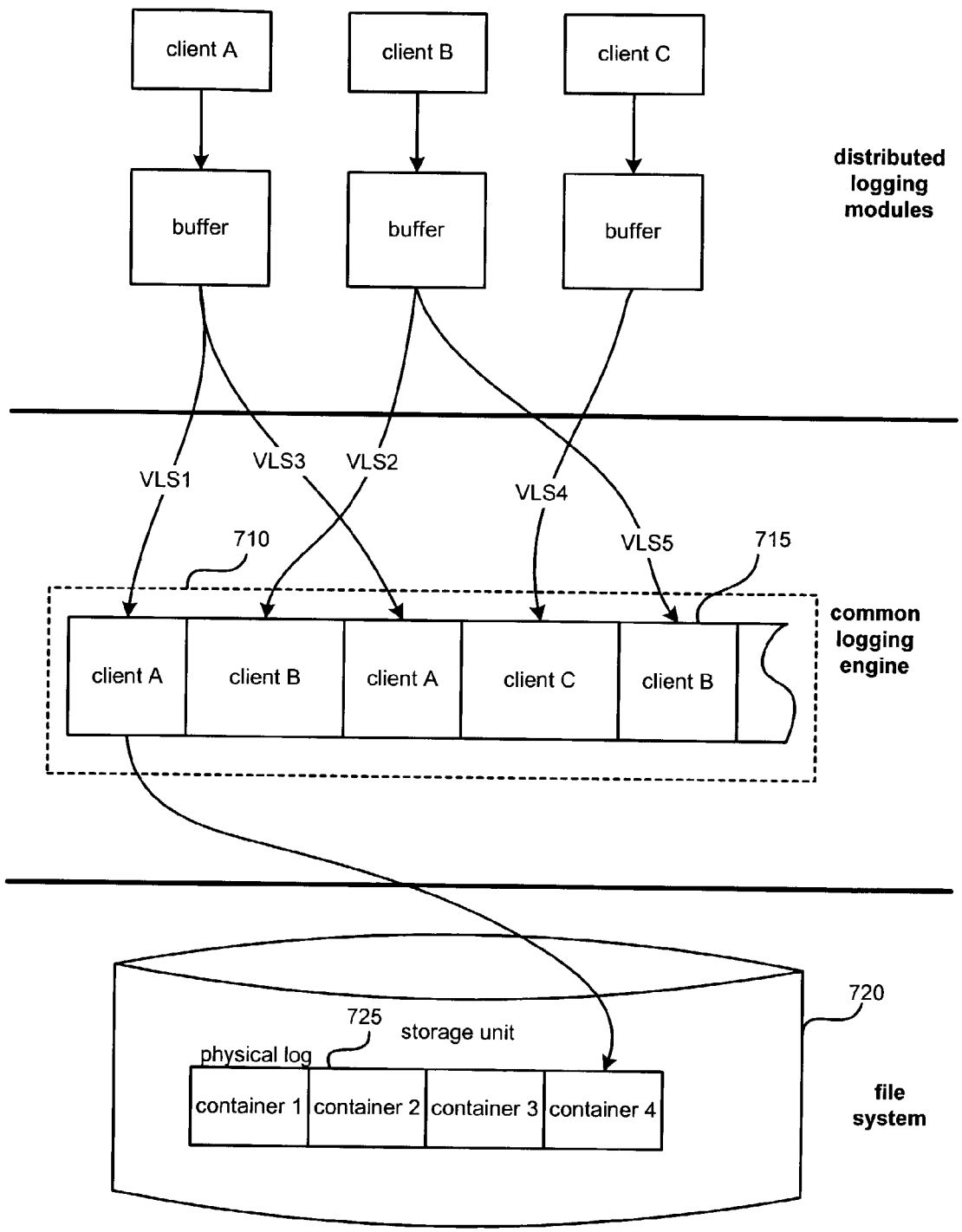
FIG. 8 is a graphical representation of how log records are stored as a log.

FIG. 8 illustrates a graphical representation of how log records are stored as a physical log. Each of clients A, B, and C maintains a virtual log through a distributed logging module, which communicates with a common logging engine implemented in the kernel of a computer. Clients A, B and C may be executing on the computer in which the common logging engine is implemented or on different computers.

As illustrated in FIG. 8, log records of each of clients A, B, and C are marshaled by their respective distributed logging modules and temporarily stored in a buffer associated with the distributed logging module. At the appropriate time, the marshaled log records in the buffer are sent to the common logging engine as a virtual log stream.

The common logging engine multiplexes virtual log streams from multiple distributed logging modules into log blocks in physical log stream 715. Physical log stream 715 may be temporarily deferred in a flush queue 710 before being written out to the storage media. Physical log stream 715 may include log records from multiple distributed logging modules, each serving a corresponding client. In one embodiment of the invention, the placement of a client's log block in the physical log stream depends on when the common logging engine receives the client's virtual log stream. For example, FIG. 8 shows that the common logging engine receives a first virtual log stream (VLS 1) from client A. VLS 1 is stored as the first log block of physical log stream 715 in flush queue 710. The common logging engine then receives a subsequent virtual log stream (VLS 2) from client B, so VLS 2 is stored as the second log block in physical log stream 715. Another virtual log stream (VLS 3) from client A is then received by the common logging engine. Since VLS 3 is received after VLS 2, VLS3 is stored as the third log block in physical log stream 715. VLS 3 is followed by VLS 4 from Client C and VLS 5 from Client B. VLS 4 and VLS 5 are stored as the fourth and the fifth log blocks in physical log stream 715, respectively. Although the log blocks from separate virtual log streams are interleaved in the physical log stream, the relative ordering of the log blocks from the same distributed logging module is preserved.

At the appropriate time, physical log stream 715 in flush queue 710 is flushed to storage unit 720 by the common logging engine. As shown in the figure, when physical log stream 715 is flushed to the storage unit, physical log stream 715 is appended to physical log 725 that is stored in the storage unit 720. In one embodiment, the physical is flushed to storage unit when the size of the physical log stream in the flush queue reaches a threshold value. As illustrated in the figure, the physical log 725 is stored in one or more file containers.

Figure 9:
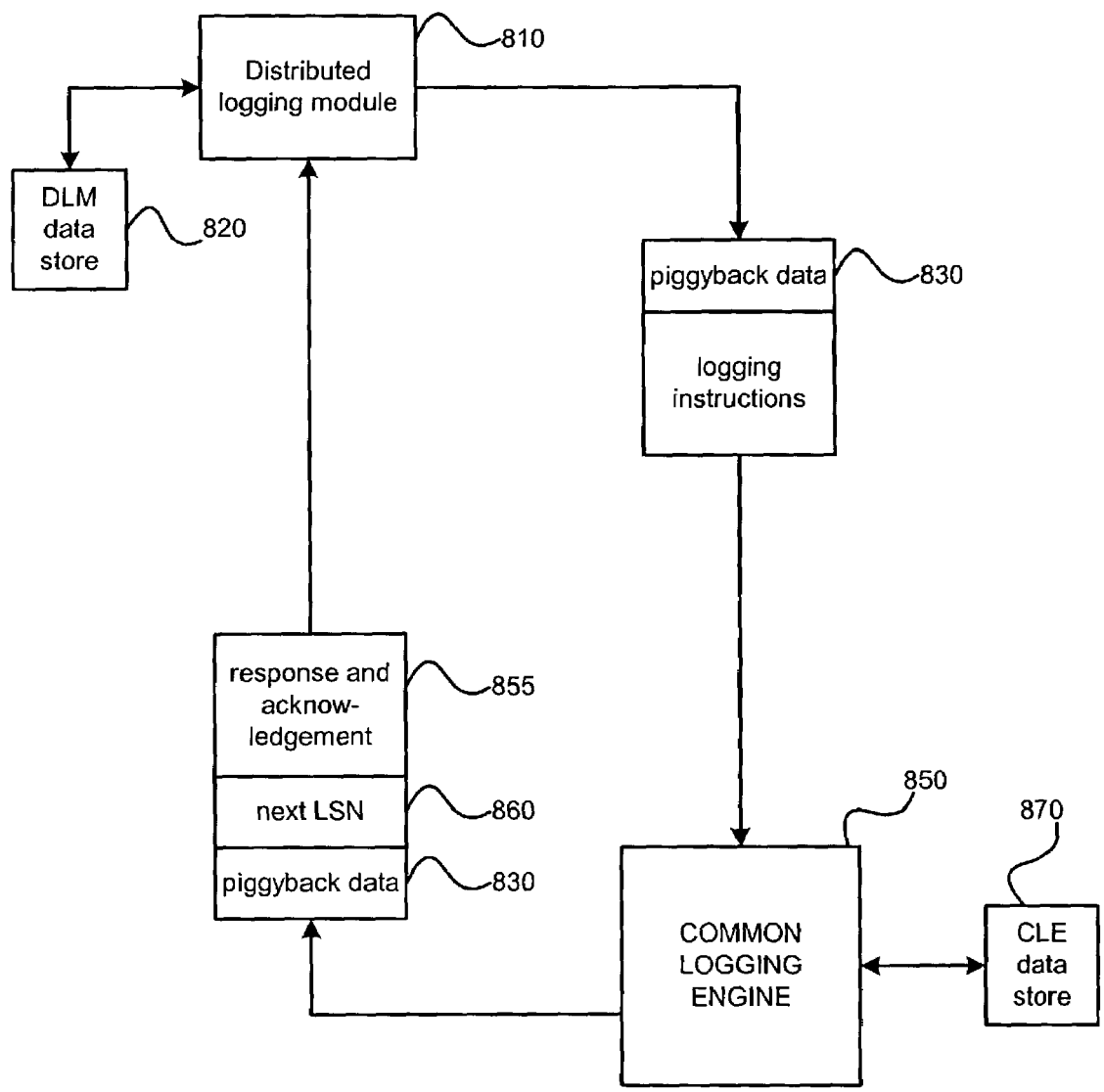
FIG. 9 is graphical representation of logging communications between a distributed logging module and a common logging engine.

FIG. 9 illustrates a graphical representation of logging communications between a distributed logging module and a common logging engine. Logging communications between a distributed logging module 810 and common logging engine 850 occurs when distributed logging module 810 sends logging instructions 820 to common logging engine 850. Logging instructions may include log data as a virtual log stream, reservation space requests, and other information related to logging. Common logging engine 850 may return response and acknowledgement 855 and next physical LSN 860 to distributed logging module 810. Response and acknowledgement 855 may include a pointer to a memory location where the virtual log stream is stored as log blocks in a physical log stream.

Whenever logging communications occur between distributed logging module 810 and common logging engine 850, piggyback data 830 may be sent along with the communications. Piggyback data 830 may include accounting data, such as identifiers for maximum and actual pre-reserved space.

Distributed logging module 810 maintains its accounting data in DLM data store 820. The accounting data that are sent by distributed logging module 810 as piggyback data 830 include data regarding maximum pre-reserved space. Common logging engine 850 maintains its accounting data in CLE data store 870. The accounting data that are returned by common logging engine 850 as piggyback data 830 include data regarding actual pre-reserved space.

Typically, distributed logging module 810 sends piggyback data 830 that includes maximum pre-reserved space when communicating with the common logging engine. Common logging engine 850 receives the communication with piggyback data 830 and compares the maximum pre-reservation space with its accounting data in CLE data store 870. Common logging engine 850 will then attempt to allocate the maximum pre-reservation to the distributed logging module 810.

Common logging engine 850 then returns data on the actual pre-reservation space to distributed logging module 810 as piggyback data 830. When distributed logging module 810 receives piggyback data 830, it updates the actual pre-reservation data to reflect the updated data sent by common logging engine 850. The updating of accounting data using piggyback data 830 forms a feedback loop that allows distributed logging module 810 to maintain updated accounting information without incurring excessive amount of communications between distributed logging module 810 and common logging engine 850.

On every request from the distributed logging module 810, the common logging engine 860 returns next physical LSN 860. The distributed logging module 810 uses next physical LSN 860 to calculate the virtual LSN that it assigns to the next log record that it marshals.

Figure 10:
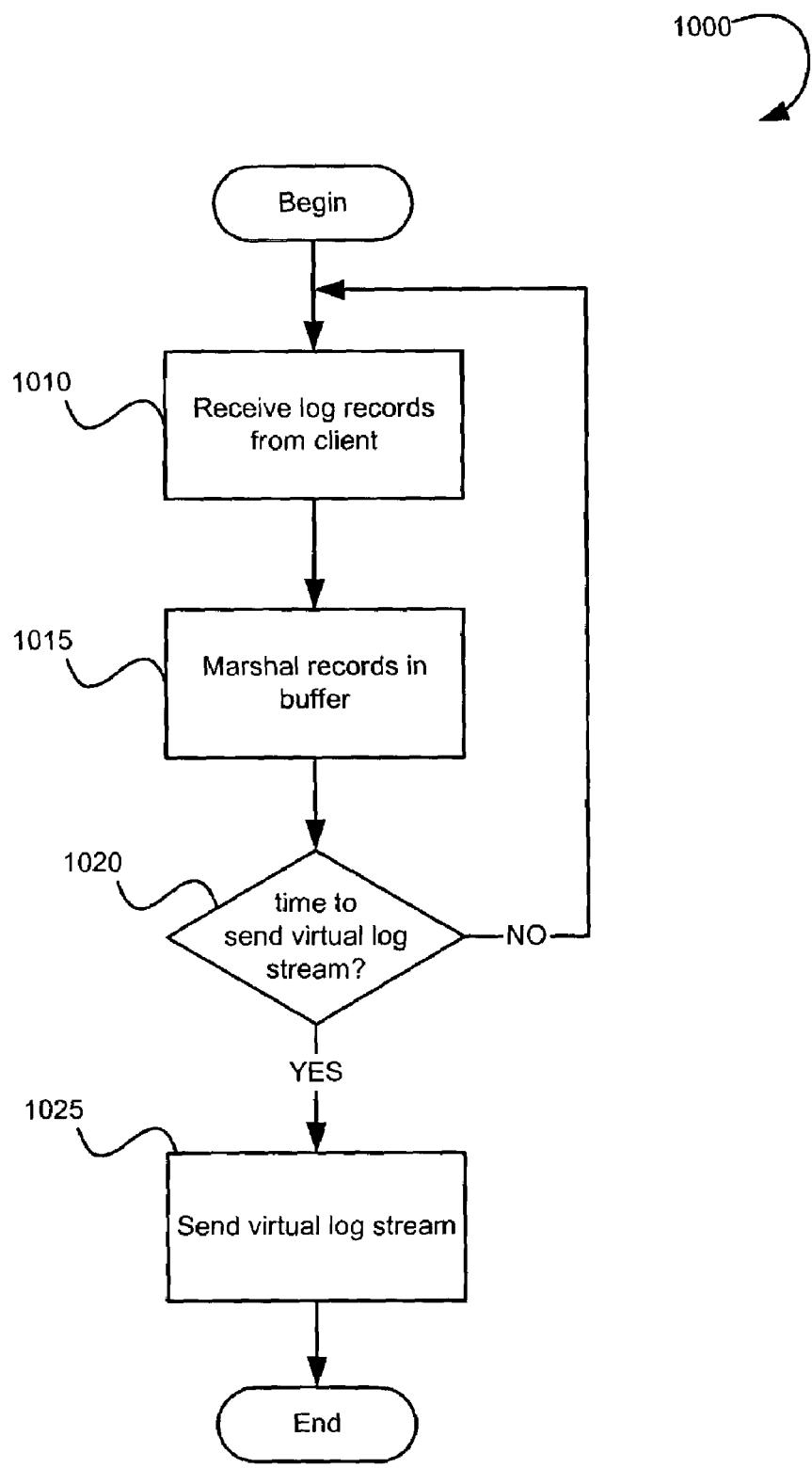
FIG. 10 is an operational flow diagram of an exemplary process that may be employed by a distributed logging module to store log records in a log.

FIG. 10 illustrates an operational flow diagram of an exemplary process that may be employed by a distributed logging module to store log records in a log. Process 1000 begins at block 1010 when log records are received from a client.

The process then moves to block 1015 where the log records are marshaled and stored in a buffer. The marshalling of log records includes adding a log block header to the records stored in the buffer and a log record header to each individual record. Both log block headers and log record headers includes virtual LSN data for identification. The LSN data used in log block header and log record headers are based on the next virtual LSN in the DLM data store of the distributed logging module.

Next, process 1000 continues at decision block 1020 where a determination is made whether it is the appropriate time to send marshaled log data in the buffer to a common logging engine. In one embodiment, the appropriate time to send the marshaled log data as a virtual log stream is when the size of the virtual log stream in the buffer reaches a threshold value. Marshaled log data is also sent to the common log engine when a client explicitly forces all its log data to be stored in a storage unit by requesting a flush. (Not shown) Clients usually request a flush to ensure that their log data are in storage.

If it is the appropriate time to send, process 1000 goes to block 1025 where the log data in the buffer are sent as a virtual log stream. Then, process 1000 ends. If it is not the appropriate time to send, process 1000 moves back to 1010 and the process repeats for another log record.

Figure 11:
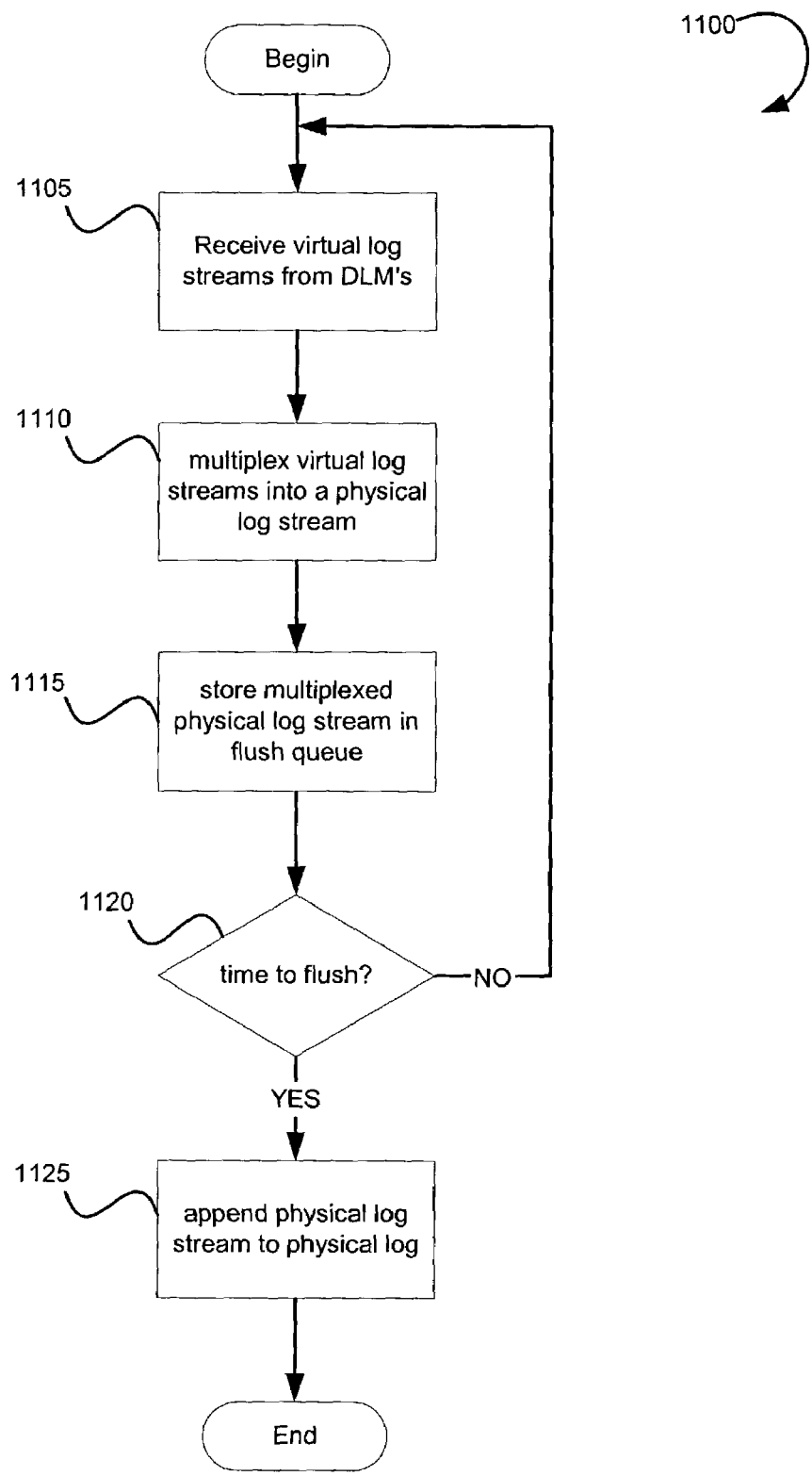
FIG. 11 is an operational flow diagram of an exemplary process that may be employed by a common logging engine to write log records to a log for one or more distributed logging modules.

FIG. 11 illustrates an operational flow diagram of an exemplary process that may be employed by a common logging engine to write log records to a log for one or more distributed logging modules. Process 1100 begins at block 1105 where multiple virtual log streams are received. The virtual log streams may be sent by one or more distributed logging modules.

Process 1100 continues at block 1110 where the virtual log streams are multiplexed into a physical log stream. Multiplexing of virtual log streams includes adding owner pages in each region of the common log file.

Next, process 1100 moves to block 1115 where the multiplexed physical log stream is stored in the flush queue. Then, process 1100 goes to decision block 1120 where a determination is made whether it is the appropriate time to store or flush the flush queue to a storage unit. In one embodiment, the appropriate time to append the multiplexed physical log stream to the physical log (i.e. flush the flush queue) is when the size of the multiplexed physical log stream in flush queue reaches a threshold value. The flush queue may also be flushed when a client explicitly forces all its log data to be stored in a storage unit by requesting a flush. (Not shown)

If it is the appropriate time to flush, the process goes to block 1125 where the multiplexed physical log stream in the flush queue is appended to the physical log. Then, process 1100 ends. Otherwise, process 1100 moves back to 1105 where the process is repeated for other virtual log streams.

Figure 12:
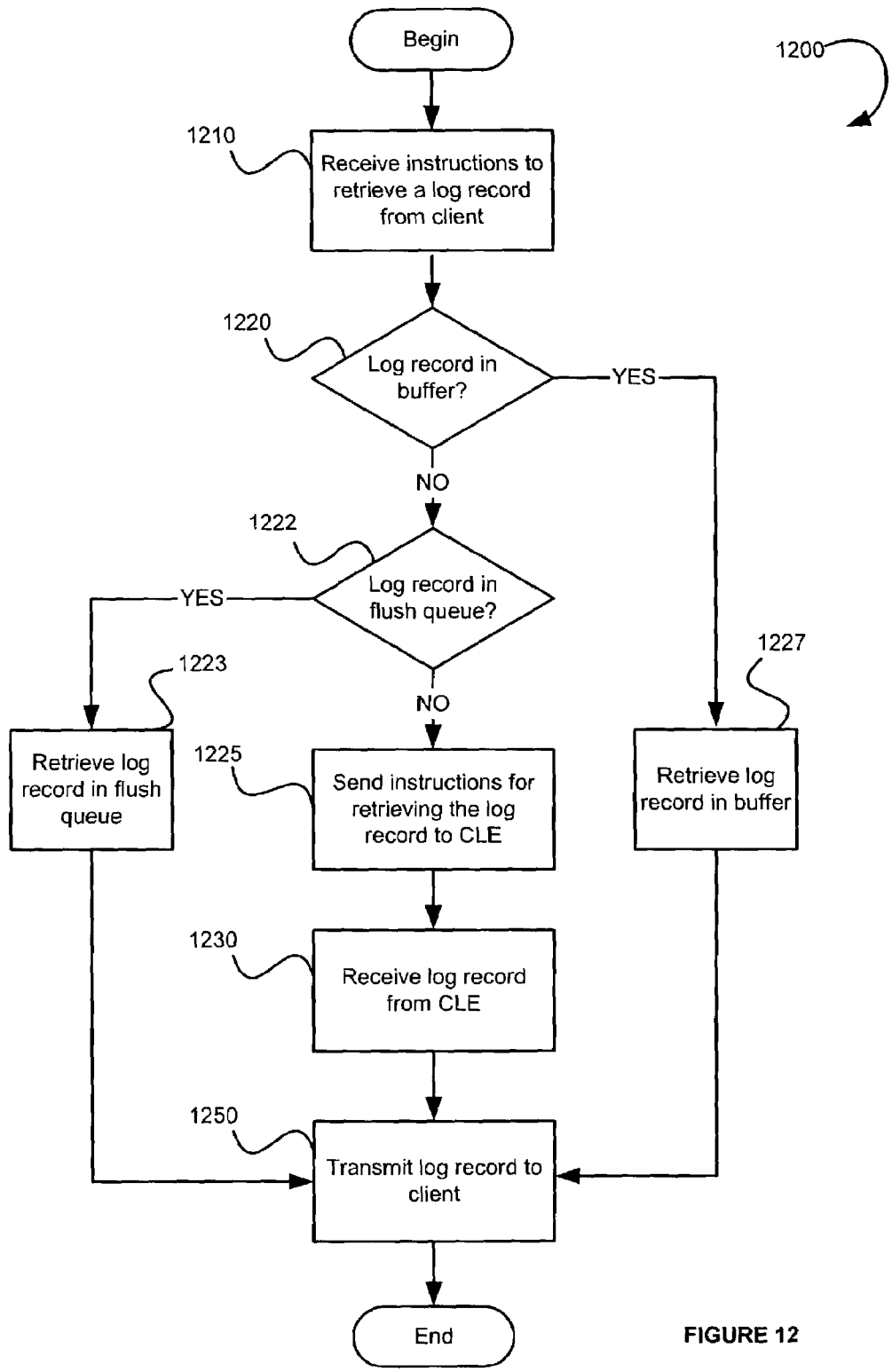
FIG. 12 is an operational flow diagram of an exemplary process that may be employed by a distributed logging module to retrieve a log record.

FIG. 12 illustrates an operational flow diagram of an exemplary process that may be employed by a distributed logging module to retrieve a log record. Process 1200 begins at block 1210 where instructions from a client to retrieve a log record identified by a virtual LSN are received.

Next, process 1200 moves to decision block 1220 where a determination is made whether the log record is in the distributed logging module's buffer. If so, process 1200 continues at block 1227 where the log record in the distributed logging module's buffer is retrieved. At block 1250, the retrieved log record is transmitted to the client.

Returning to block 1220, if the log record is not in the distributed logging module's buffer, process 1200 goes to decision block 1222 where a determination is made whether the log record is in the flush queue. If so, process 1200 moves to block 1223 where the log record in the flush queue is retrieved. At block 1250, the retrieved log record is transmitted to the client.

Returning to block 1222, if the log record is not in the flush queue, process 1200 goes to block 1225 where instructions for retrieving the log record are sent to a common logging engine. The instructions include the virtual LSN of the log record. At block 1230, the log record is received from the common logging engine. Next, at block 1250, the retrieved log record is transmitted to the client.

Figure 13:
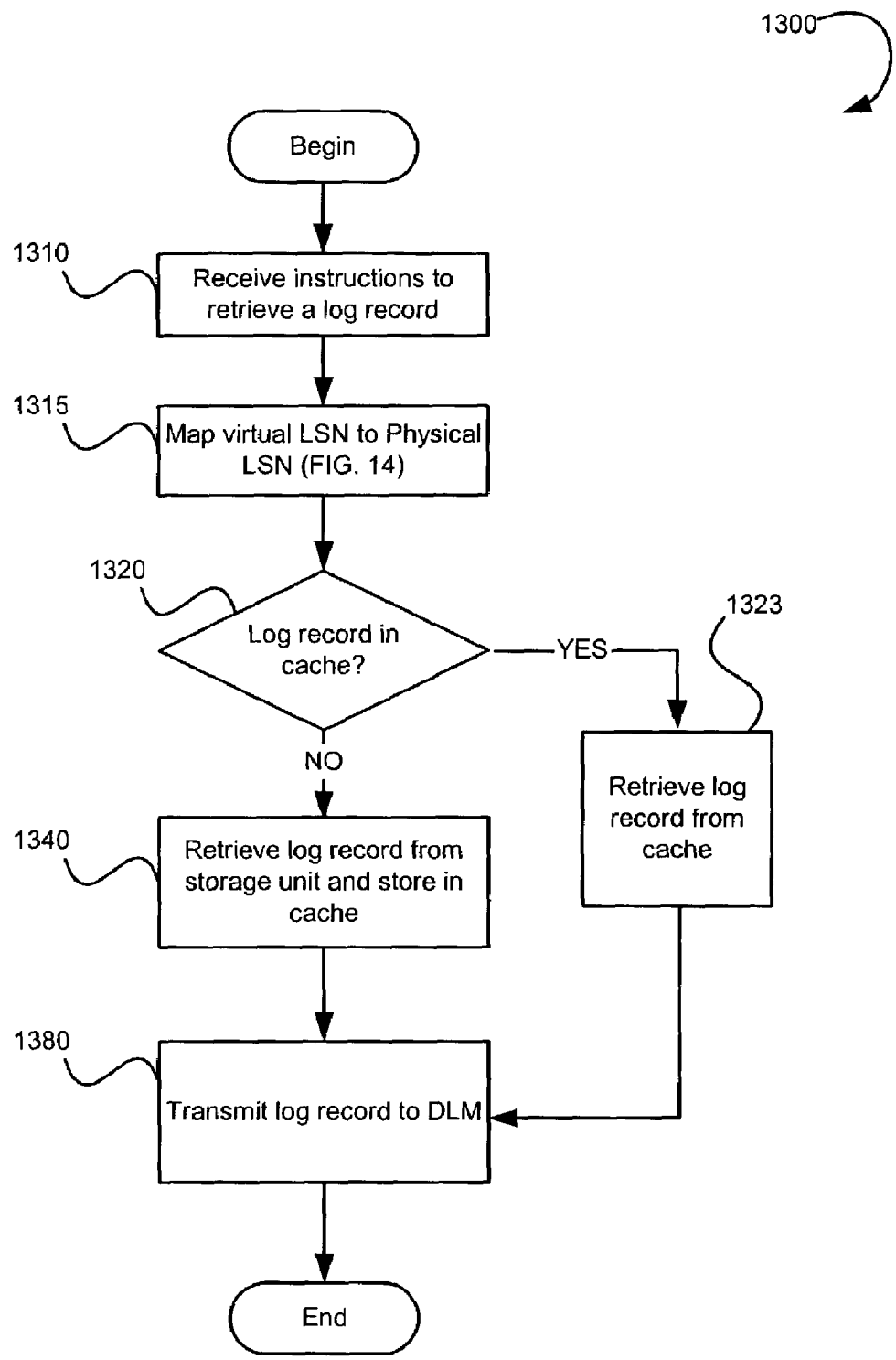
FIG. 13 is an operational flow diagram of an exemplary process that may be employed by a common logging engine to retrieve a log record.

FIG. 13 illustrates an operational flow diagram of an exemplary process that may be employed by a common logging engine to retrieve a log record. Process 1300 begins at block 1310 where instructions from a distributed logging module to retrieve a log record are received. The instructions include the virtual LSN of the log record.

At block 1315, the virtual LSN of the log record is mapped to a physical LSN. Virtual to physical LSN mapping will be discussed in detail in conjunction with FIG. 14. Briefly stated, the physical LSN of a log record is determined using the virtual LSN and owner pages stored in the owner page cache of the common logging engine.

Next, at decision block 1320, a determination is made whether the log record associated with the physical LSN is in the memory cache. If so, process 1300 moves to block 1323 where the log record is retrieved from the memory cache. The process then moves to block 1380.

Returning to block 1320, if the log record is not in the memory cache, process 1300 goes to block 1340 where the log record at a location specified by the physical LSN is retrieved from the physical log in the storage unit and stored in memory cache. In one embodiment, several log blocks of the log, including the block containing the log record, is retrieved from the storage unit and stored in the memory cache. Retrieval of several log blocks of the log at one time facilitates the retrieval of log records that are stored in close proximity in the log to the desired log record.

At block 1380, the retrieved log record is transmitted to the distributed logging module that requested the record. Then, process 1300 ends.

Figure 14:
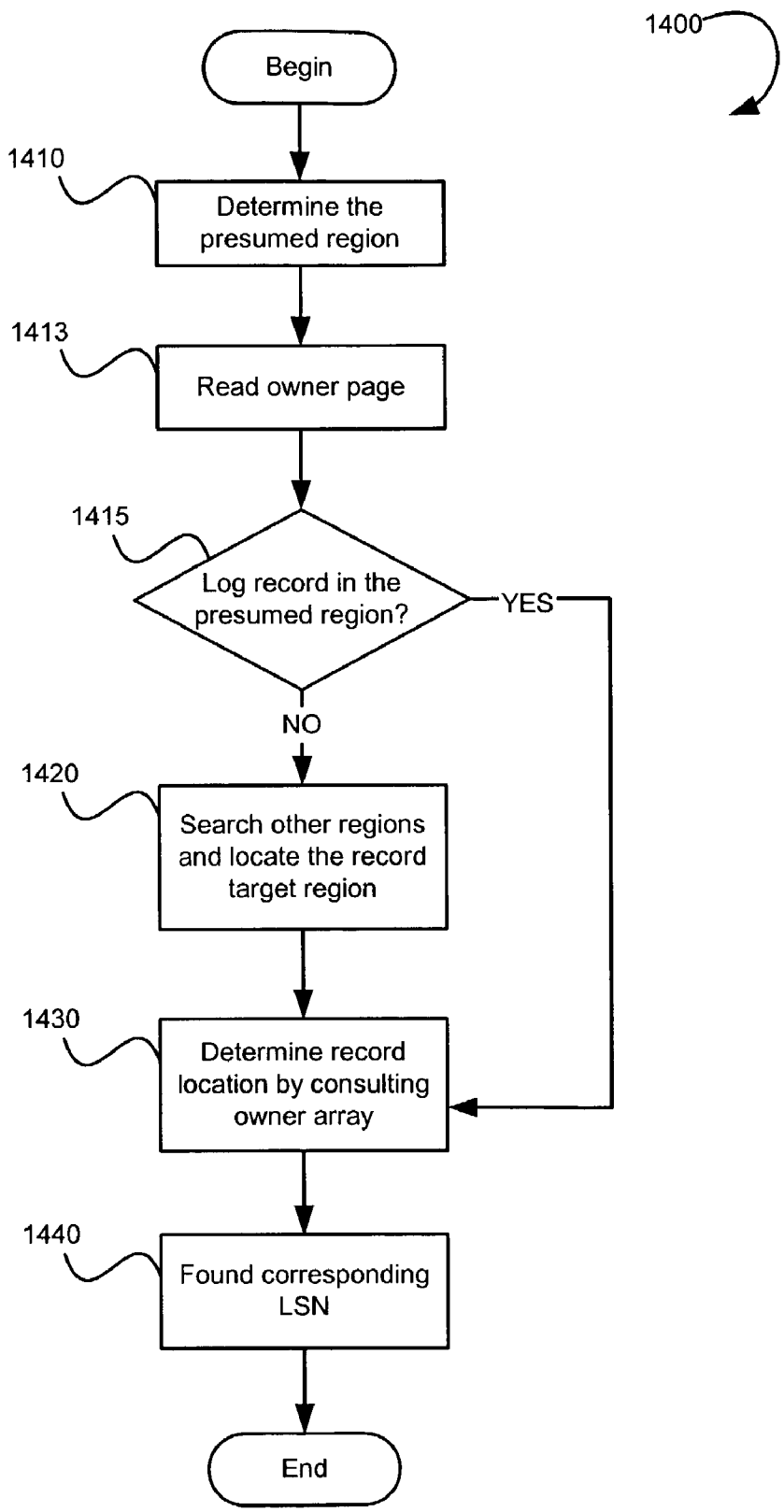
FIG. 14 is an operational flow diagram of an exemplary virtual LSN to physical LSN mapping process; according to embodiments of the invention.

FIG. 14 illustrates an operational flow diagram of an exemplary virtual LSN to physical LSN mapping process. Process 1400 begins at block 1410 where the presumed region is determined. The presumed region is the region indicated by a virtual LSN of the log record as if the virtual LSN is the same as its corresponding physical LSN.

Process 1400 then moves to block 1413 where the owner page of the presumed region is read. Owner pages for each of the regions of a log may be stored in a owner page cache associated with a common logging engine. An owner page includes an owner referral, which contains the minimum virtual LSN and the maximum virtual LSN in a region where a particular client has log records.

Next, at decision block 1415, a determination is made whether the requested log record is in the presumed region. The log record may not be in the presumed region because the virtual LSN may not correspond to the physical LSN. A distributed logging module assigns the virtual LSN to the log record and stores the log record temporarily in a buffer. As a result, the virtual LSN is typically assigned to the log record by a distributed logging module before the log record is appended to a physical log by a common logging engine. During the period after the virtual LSN was assigned to the log record and before the log record is stored to the physical log, log records from other distributed logging modules could be appended to the physical log, resulting in a difference between the virtual LSN and the physical LSN of the log record.

Whether a log record is in the presumed region is determined by matching the virtual LSN of the record against the virtual LSN range in the owner referral associated with the region. If the virtual LSN falls within the range in owner referral, then the log record is in the presumed region. Otherwise, it is not in the presumed region.

If a log record is in the presumed region, then the process moves to block 1430. If not, process 1400 continues at block 1420 where the record target region is located by searching other regions in a log. Other regions are searched by matching the virtual LSN with the LSN range indicated by the owner referrals associated with the other regions. When the correct region is found, process 1400 also moves to block 1430.

At block 1430, the location of the record is determined by consulting an owner array of the correct region. Owner array identifies the client owner of each of the sectors in a particular region. Since the client owner of the log record is known, the location of the log record can be determined by scanning the owner array for the sector represented by the virtual LSN.

Next, at block 1440, the physical LSN corresponding to the virtual LSN is found and the process ends.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method of performing transactional logging for a computer application program, comprising:

receiving log records from each of a plurality of computer application programs:

marshalling the log records into a buffer before sending a plurality of virtual log streams;

receiving at least one instruction to retrieve a log record front at least one of the computer application programs;

if the log record is in the buffer, retrieving the log record in the buffer;

if the log record is in a flush queue, retrieving the log record in the flush queue; and transmitting the log record to the computer application program; and sending the marshaled log records to a common log engine in the plurality of virtual log streams, each of the virtual log streams being associated with a computer application program in the plurality of computer application programs.

2. The computer-implemented method of claim 1, further comprising if the log record is not in the buffer or the flush queue, sending an instruction for retrieving the log record to the common logging engine.

3. A computer-implemented method for maintaining a log for a plurality of computer application programs, comprising:

receiving a plurality of virtual log streams by a common logging engine, each virtual log stream comprising log data associated with one of the computer application programs;

multiplexing the virtual log streams into a single physical log stream;

appending the multiplexed physical log stream to a physical log;

receiving at least one instruction from at least one of a plurality of distributed logging components to retrieve a log record, the distributed logging components being associated with the computer application programs, mapping a virtual log sequence number (LSN) associated with the log record to a physical LSN;

if the log record is in a memory cache associated with to common lagging engine, retrieving the log record from the memory cache;

if the log record is in a storage unit, retrieving the log record from the storage unit; and transmitting the retrieved log record to the distributed logging component.

4. The computer-implemented method of claim 3, wherein at least one of the virtual log streams is received from a remote computer application program over a network.

5. The computer-implemented method of claim 3, further comprising deferring the multiplexed physical log stream in a flush queue before appending the multiplexed physical log stream to the physical log.

6. The computer-implemented method of claim 3, wherein multiplexing the virtual log streams further comprises:

parceling the log data into a plurality of log blocks, each of the log blocks being associated with one of a plurality of regions in the physical log stream; and assigning an owner array to each of the regions, wherein for each of the log blocks in the region, the owner array identifies one of the computer application programs that is associated with the log block.

7. The computer-implemented method of claim 6, further comprising assigning an owner referral to each of the regions, wherein the owner referral identifies a range of log blocks associated with each of the computer application programs.

* * * * *

UNITED STATES PATENT AND TRADEMARK OFFICE
CERTIFICATE OF CORRECTION

PATENT NO. : 7,007,197 B2
APPLICATION NO. : 10/159227
DATED : February 28, 2006
INVENTOR(S) : Thomas Jay Miller et al.

It is certified that error appears in the above-identified patent and that said Letters Patent is hereby corrected as shown below:

Title Pg, Item (56), under "U.S. Patent Documents", in column 2, line 6, after "6,850,942" delete "B1" and insert -- B2 --, therefor.

In column 13, line 21, in Claim 1, delete "programs:" and insert -- programs; --, therefor.

In column 13, line 25, in Claim 1, delete "front" and insert -- from --, therefor.

In column 13, line 32, in Claim 1, delete "log" and insert -- logging --, therefor.

In column 14, line 9, in Claim 3, delete "programs," and insert -- programs; --, therefor.

In column 14, line 12, in Claim 3, delete "to" and insert -- the --, therefor.

In column 14, line 14, in Claim 3, delete "lagging" and insert -- logging --, therefor.

Signed and Sealed this

Twenty-eighth Day of July, 2009

JOHN DOLL
*Acting Director of the United States Patent and Trademark Office*